(12) United States Patent
Sahita et al.

(10) Patent No.: US 9,898,605 B2
(45) Date of Patent: Feb. 20, 2018

(54) MONITORING EXECUTED SCRIPT FOR ZERO-DAY ATTACK OF MALWARE

(71) Applicant: McAfee, LLC, Santa Clara, CA (US)

(72) Inventors: Ravi Sahita, Portland, OR (US); Xiaoning Li, Hillsboro, OR (US); Lixin Lu, San Jose, CA (US); Lu Deng, Santa Clara, CA (US); Alexander Shepsen, Palo Alto, CA (US); Xiang Xu, Santa Clara, CA (US); Liangjun Huang, Santa Clara, CA (US); Hua Liu, Sunnyvale, CA (US); Kai Huang, Sunnyvale, CA (US)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 14/757,979

(22) Filed: Dec. 24, 2015

(65) Prior Publication Data

US 2017/0185774 A1   Jun. 29, 2017

(51) Int. Cl.
G06F 21/56 (2013.01)
G06F 21/53 (2013.01)
G06F 21/57 (2013.01)

(52) U.S. Cl.
CPC .......... G06F 21/566 (2013.01); G06F 21/53 (2013.01); G06F 21/577 (2013.01)

(58) Field of Classification Search
CPC .................................................. G06F 21/566
USPC .......................................................... 726/23
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 8,839,428 B1 | 9/2014 | Oliver et al. | |
| 9,241,010 B1 * | 1/2016 | Bennett | H04L 63/145 |
| 9,405,570 B2 | 8/2016 | Sahita et al. | |
| 2008/0016339 A1 | 1/2008 | Shukla | |
| 2009/0300764 A1 * | 12/2009 | Freeman | G06F 21/55 |
| | | | 726/24 |
| 2011/0277033 A1 | 11/2011 | Ramchetty et al. | |
| 2011/0289582 A1 | 11/2011 | Kejriwal et al. | |
| 2013/0117743 A1 | 5/2013 | Neiger et al. | |
| 2013/0139264 A1 * | 5/2013 | Brinkley | G06F 21/566 |
| | | | 726/24 |

(Continued)

OTHER PUBLICATIONS

International Search Report and Written Opinion in International Application No. PCT/US2016/062988, dated Feb. 24, 2017, 13 pages.

Primary Examiner — Henry Tsang
(74) Attorney, Agent, or Firm — Patent Capital Group

(57) ABSTRACT

Embodiments are directed to hooking a call for a malware monitoring logic into a JavaScript API engine interpreter. Upon JavaScript being placed into heap memory, the malware monitoring logic can initiate an evaluation or analysis of the heap spray to determine whether the JavaScript includes malware or other malicious agents prior to execution of the JavaScript shell code. Upon execution of the JavaScript within the sandbox, the malware monitoring logic can initiate monitoring of the JavaScript using malware analysis and/or execution profiling techniques. Inferences can be made of the presence of malware based on a start and end time of the JavaScript execution.

17 Claims, 10 Drawing Sheets

(56) References Cited

U.S. PATENT DOCUMENTS

| | | |
|---|---|---|
| 2013/0160127 A1 | 6/2013 | Jeong et al. |
| 2014/0013326 A1 | 1/2014 | Neiger et al. |
| 2014/0283076 A1* | 9/2014 | Muttik .................. G06F 21/554 726/24 |
| 2014/0317745 A1* | 10/2014 | Kolbitsch ........... H04L 63/1416 726/24 |
| 2015/0067763 A1 | 3/2015 | Dalcher et al. |
| 2015/0121366 A1 | 4/2015 | Neiger et al. |

* cited by examiner

MONITORING EXECUTED SCRIPT FOR ZERO-DAY ATTACK OF MALWARE

TECHNICAL FIELD

This disclosure pertains to computer security, and more particularly, to monitoring for zero-day attacks of malware.

BACKGROUND

Monitoring for zero-day application vulnerability may often rely on manual analyses or signature based detection, approaches that replicate the attack first. Replications can only succeed with the right version, patch, etc. of the vulnerable application and the right environment. Such approaches also wait until the embedded shell code executed. These approaches can miss some zero-day attacks because execution handlers may not be implementing the intended versions of the malware.

DETAILED DESCRIPTION

Figure 1:
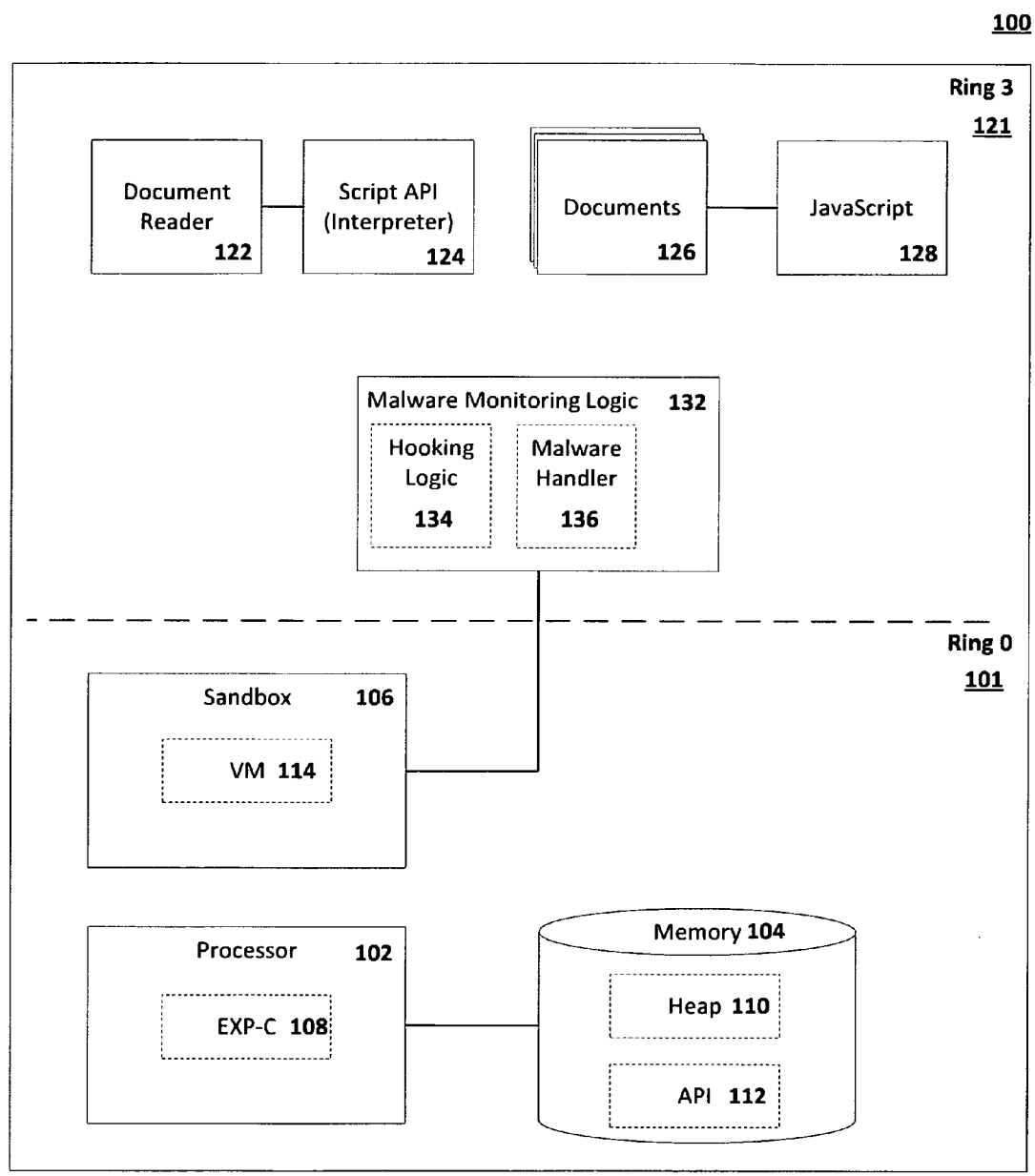
FIG. 1 is a schematic block diagram of a system for monitoring a file for zero-day attacks in accordance with embodiments of the present disclosure.

The present disclosure describes hooking a call to a sandbox for malware monitoring into a script application programming interface (API) engine. Because certain files, such as PDF files, can contain embedded script that acts as malicious malware, invoking the sandbox upon execution of the script API engine can allow the sandbox to monitor all script code that gets placed into the heap. The script code placed in the heap can be analyzed for malware regardless of whether the script is executed. For example, in some cases, malware may target specific versions, builds, or patches of applications. Other factors may also cause malware to not execute, such as the wrong operating system or environment. So, even if malware is present in a file, the malware might not execute in the sandbox because the applications present on the system are not the version the malware is targeting. By evaluating the script code in the heap prior to the execution of the code, malware can be evaluated and analyzed regardless of the applications versions or operating environment present.

Document files that include embedded shell code can be loaded by a script API engine, such as escript.api. Examples of such files include PDF files and other electronic document files. The script API engine is part of the system dynamic link library (DLL). The script API engine provides execution functionalities, such as compiling the embedded script code and executing the script code. Compiling script code can take the encrypted script and translate/decrypt it and make it ready for execution. This disclosure describes hooking a call to a sandbox into the compiling and executing routine inside the DLL.

Once the compiling starts, the sandbox knows that the file contains embedded script code (because the sandbox is called by the script API engine). Similarly, the sandbox can hook into the JavaScript execution, and once the executing has started, sandbox knows that the embedded script code has started.

For example, if the execution logic continues without exiting, given some period of time, the malware handler can conclude that the program execution jumped into its embedded shell code, which indicates a vulnerability exploiting attack. If the execution logic exited normally, say within a predetermined time period, the JavaScript placed in heap can be examined and searched for "No Operation" or "NOOP" code to identify if it has done heap spraying. Such analysis is performed before the shell code execution. Checking heap spreading this way can detect vulnerability attack even if the targeting application is not the right version (i.e., even if the JavaScript is not executed in the sandbox).

This features described herein can be done automatically in a dynamic approach, and it can be done ahead of its attacking shell code get executed. The present disclosure describes detecting zero-day attacks before its payloads (shell code) execution, and in some cases, using Exp-C. The disclosure describes detecting and analyzing zero-day application vulnerability exploiting attacks without relying on the right version of targeted vulnerable application.

FIG. 1 is a schematic block diagram of a computing system 100 for monitoring a file for zero-day attacks in accordance with embodiments of the present disclosure. Computing system 100 can be a personal computer, a server, a tablet, a smart phone or other computing system. Some features shown in FIG. 1 may be moved to remote servers or to the cloud, as opposed to or in addition to being local to the computing system 100.

Computing system 100 includes a processor 102. Processor 102 can be implemented at least partially in hardware. Processor 102 is configured to execute instructions, programs, APIs, and otherwise control other hardware and software modules. Computing system 100 also includes a memory 104. Memory 104 may be implemented at least partially in hardware. Memory 104 can be local to computing system 100 or may be located remotely or may be accessible via a network connection (e.g., through a network interface 122). The memory 104 can include a heap 110. Heap 110 is dynamically allocated memory that can be used by specific applications during runtime. The memory 104 can also store the dynamically linked library, which can include application program interfaces, runtime engines, and other programs.

The computing system 100 can be configured to receive a file. The file can be received by any number of ways, such as Internet download, e-mail attachment, viewing in a browser, downloaded from a storage device, etc. The file can be any type of file that includes embedded script, such as embedded JavaScript. Among such files are PDF files, WORD™ document files, etc. The computing system 100 includes a document reader 122 that is configured to recognize the file type and provide a way for a user to read or otherwise interact with the file. The document reader 122 can call DLL programs, such as the script engine API 124. In some embodiments, the script API 124 may include an interpreter. In some embodiments, the script API 124 is an escript.api that is launched by the document reader 122 to execute JavaScript 128 embedded in document 126.

Often, malware can be written into files as embedded JavaScript 128 executed when document 126 are loaded by the document reader 122. During runtime operation, the JavaScript 128 can be stored in heap 110 associated with the script API.

In some embodiments, the document reader 122 can be an add-in to a web browser. In some embodiments, the document reader 122 can be a stand-alone user interface, such as Adobe Reader™ or Microsoft Word™.

The computing system 100 can also include a sandbox 106. Sandbox 106 can be implemented in hardware, software, or a combination of hardware and software. Sandbox 106 includes a secure environment for executing files that may contain malware or other malicious agents. The sandbox may be used to open suspect files or execute suspect application programs so that if there is attack code in the suspect files or application programs, the attack will be contained in the sandbox. The attack code may then be dealt with according to prescribed policies. By accessing the suspect files only in the sandbox, further propagation of the attack code may be diminished and the attack may be more easily detected. In some embodiments, a virtual machine 114 can be used to create a runtime environment that is isolated from the rest of the computing system 100.

The processor 102, the memory 104, and the sandbox 106 can be included in a high privileged area 101 of the computing system 100. For example, the processor 102, the memory 104, and sandbox 106 can be in Ring 0.

The computer system 100 also includes a malware monitoring logic 132 that can be implemented in hardware, software, or a combination of hardware and software. Malware monitoring logic 132 can include hooking logic 134 and malware handler 136.

The malware handler 136 is configured to analyze code stored in heap 110 for malware or other malicious agents. The malware handler 136 also monitors execution of script in the sandbox 106 to determine the presence of absence of malware or other malicious agents. In some embodiments, malware handler can include a proprietary malware analysis engine, such as the Advanced Threat Detector (ATD).

Hooking logic 134 can be implemented in hardware, software, or a combination of hardware and software. A malware monitoring call (i.e., code that calls or triggers the operation of the malware monitoring logic 132) can be hooked into the script API 124. Hooking is described in more detail below with FIG. 3A, but generally, hooking includes injecting code during runtime of the document reader into the process address space for the script API. The code injected into the API process address space includes a function call to the malware monitoring logic 132. Hooking logic 134 can be used to inject code into the script API 124 process address space.

In some embodiments, the computing system 100 is configured for execution profiling (EXP-C) 108. EXP-C 108 can perform heap allocation tracking as well as performing checks on each execution branch taken by the script. An example of EXP-C can be found at, among other documents, U.S. patent application Ser. No. 14/129,246 filed on Apr. 10, 2014. EXP-C can be used to monitor the script execution events without modifying system APIs in order to examine possible shell code or heap spraying or other potential indicators of malware. The computing system 100 can include microcode installed to utilize EXP-C features.

Figure 2:
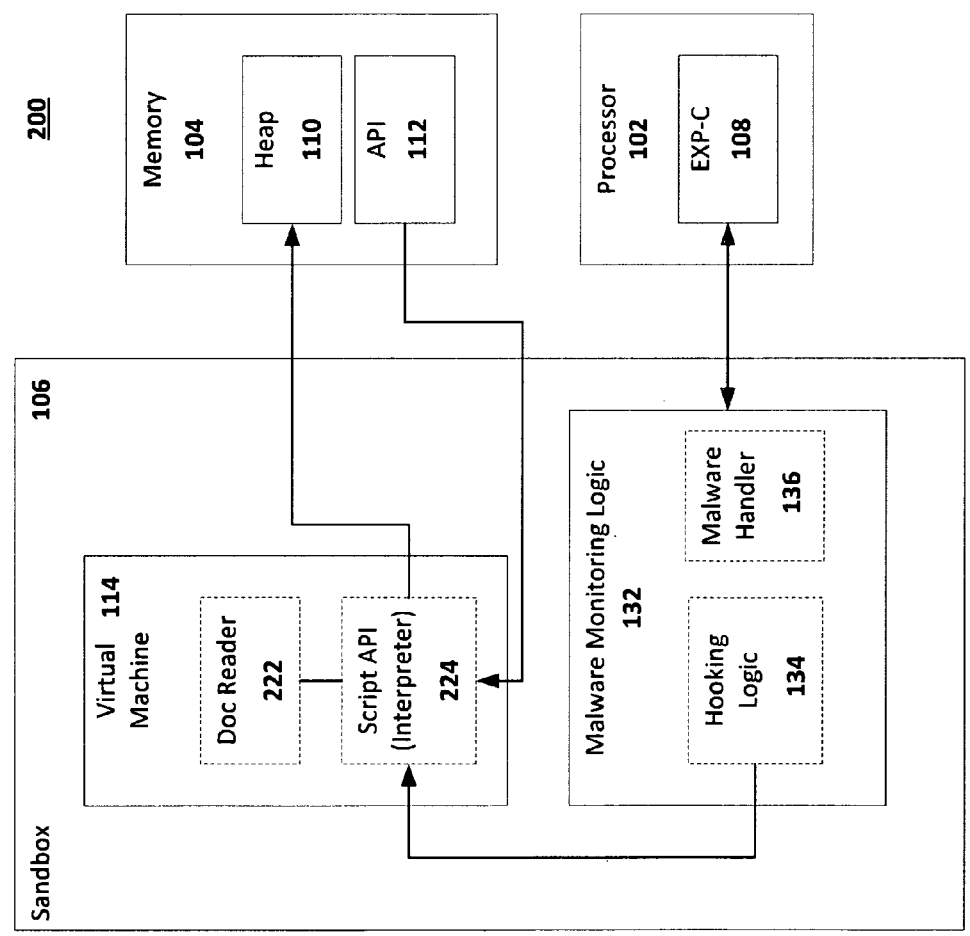
FIG. 2 is a schematic block diagram of a sandbox environment for monitoring for zero-day attacks in accordance with embodiments of the present disclosure.

FIG. 2 is a schematic block diagram of a sandbox environment 106 for monitoring for zero-day attacks in accordance with embodiments of the present disclosure. The sandbox environment 106 provides a secure environment for executing unknown or suspicious programs and for evaluating code for malware or other malicious agents. The sandbox environment 106 can include a virtual machine 114 for executing instantiations of document reader 222 and the script API 224. Script API is an API 112 called by the document reader 222 for executing JavaScript. The malware monitoring logic 132 can be run in the sandbox environment 106. Malware monitoring logic 132 can include hooking logic 118 that injects code into the script API at runtime for calling the malware monitoring logic 132. Malware monitoring logic 132 can also call EXP-C functionality 108, which notifies the malware monitoring logic 132 of indirect branch calls or other indicators of suspicious instructions or memory calls.

Figure 3A:
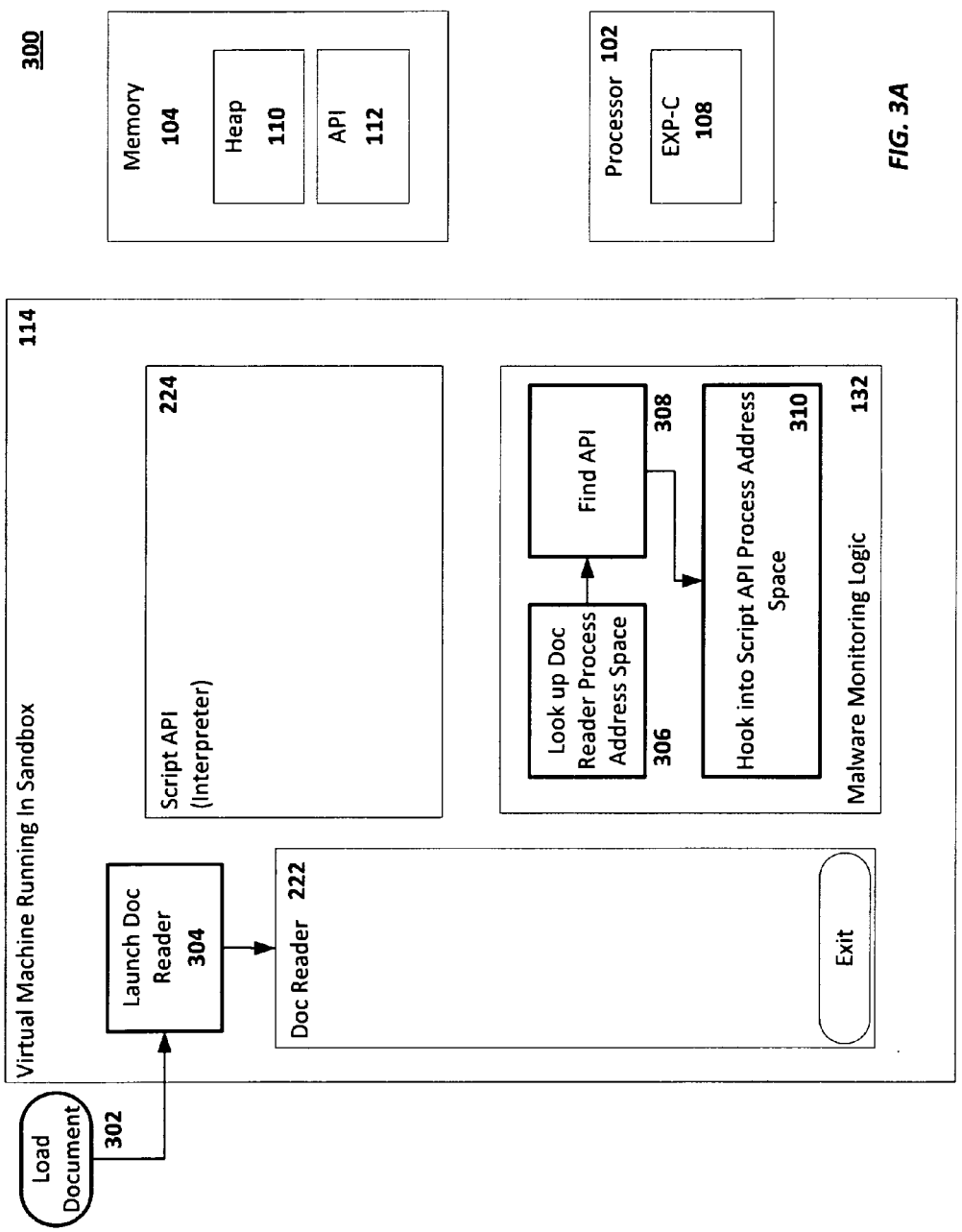
FIG. 3A is a process flow diagram for monitoring a file for zero-day attacks in accordance with embodiments of the present disclosure.

FIG. 3A is a schematic block diagram illustrating a procedure for monitoring a file for zero-day attacks in accordance with embodiments of the present disclosure. The process steps are highlighted by bold boxes.

At the outset, an instruction is received to load a document (302). An instance of the document reader 222 can be launched by the virtual machine 114 within the sandbox environment (304) After the document reader 222 is launch, the malware monitoring logic 132 can hook into the document reader API. For example, after the document reader is launched, the malware monitoring logic 132 can look up the document reader process address space (306) to locate the one or more API run by the document reader (308). In this example, the API includes a script API for running JavaScript. The malware monitoring logic 132 can then inject code into the API (310). The injected code would call the malware monitoring logic 132 when the API is executed.

As an example, a LoadLibraryEx function can be hooked or injected into the script API 224 at runtime. At the point of loading the script API 224, the injected library can start monitoring the JavaScript execution.

Figure 3B:
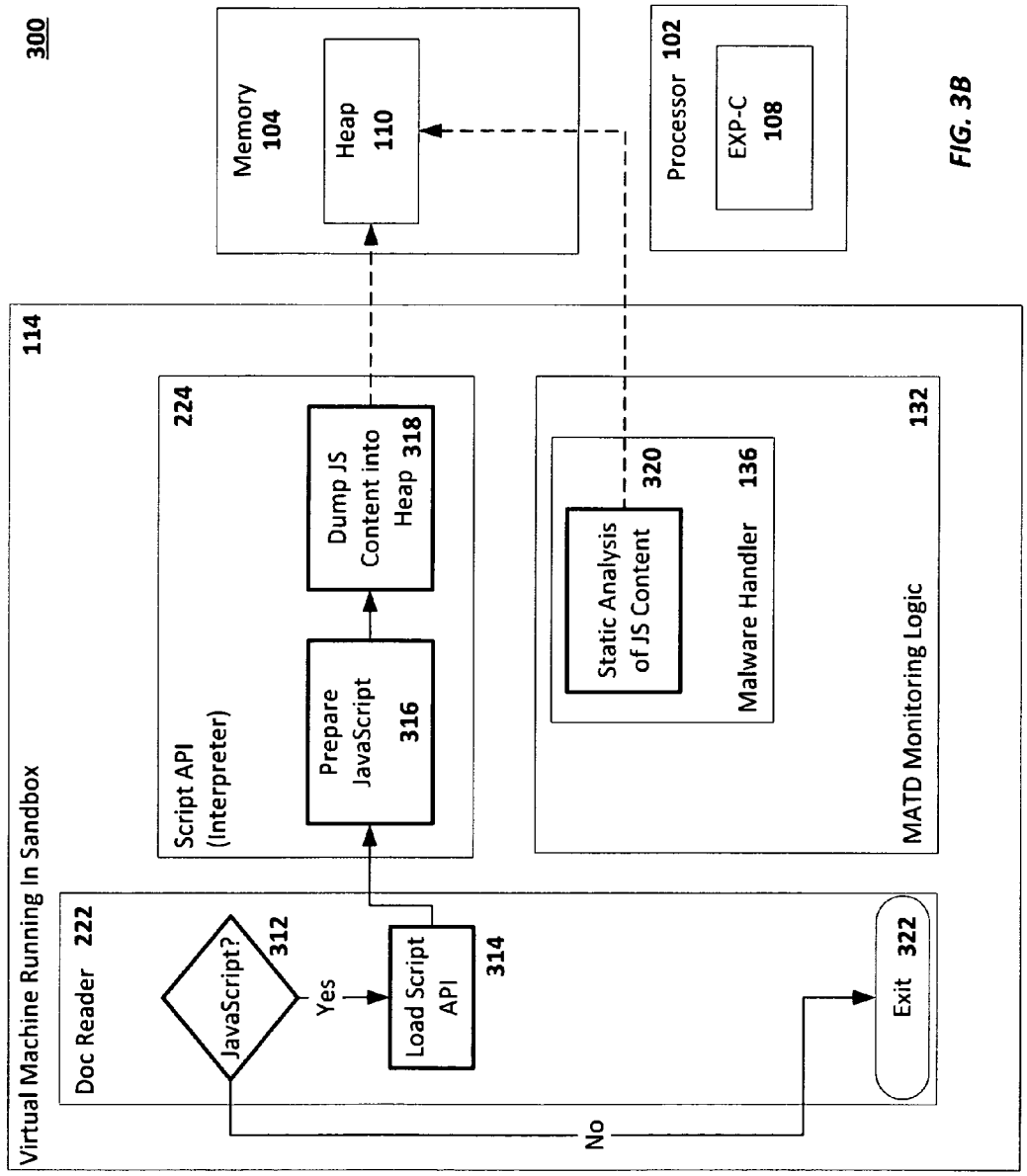
FIG. 3B is a process flow diagram for monitoring a file for zero-day attacks in accordance with embodiments of the present disclosure.

Turning now to FIG. 3B, FIG. 3B is a schematic block diagram illustrating a procedure for monitoring a file for zero-day attacks in accordance with embodiments of the present disclosure.

As part of the document reader operation, the document reader 222 can determine whether the document includes embedded JavaScript (312). If there is no embedded JavaScript, the document reader could exit this process and open the document (322). If there is embedded JavaScript in the document, then the document reader 222 can launch a script API 224 (314), such as the escript.api, within the virtual machine 114 to run the JavaScript.

As previously mentioned, the malware monitoring logic 132 call is hooked into the script API at runtime, such that when the script API 224 is executed, the injected code calls the malware monitoring logic 132 functions as well.

The script API 224 can prepare the JavaScript for the execution (316). For example, the script API 224 can compile the JavaScript and decrypt the JavaScript. The script API 224 can also allocate the heap 110 and then set up the execution code in the allocated heap (318).

A malware handler 136 can perform a static analysis of the JavaScript content that is stored in the heap for malware or other malicious agents (320). For example, the JavaScript source can be analyzed through a set of static engines such as rules matching (sequences of specific JAVASCRIPT functions such as unescape and presentations of NOP operations such as % u9090). All of the mentioned JavaScript operations are indicated as shellcode presence.

Figure 3C:
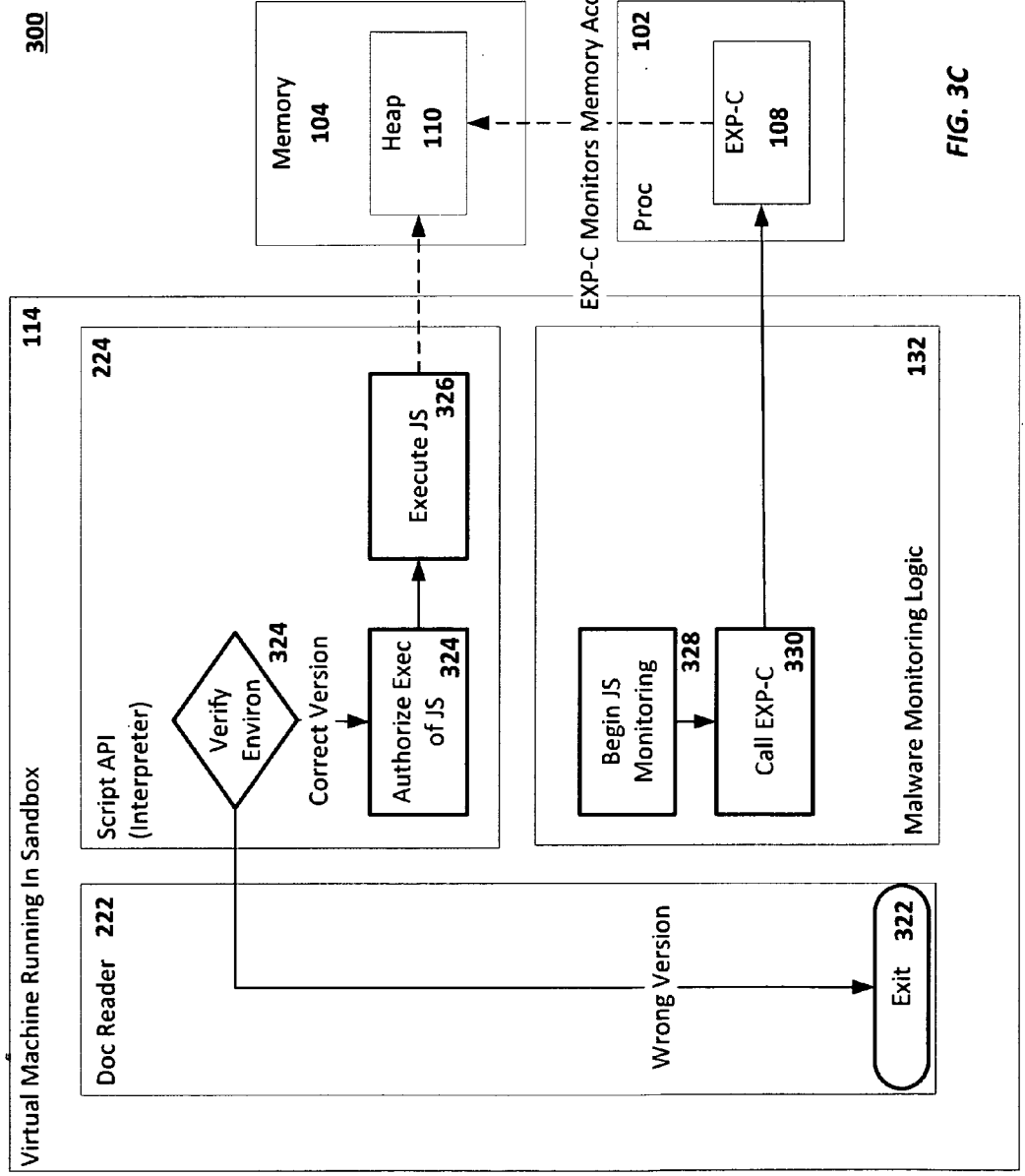
FIG. 3C is a process flow diagram for monitoring a file for zero-day attacks in accordance with embodiments of the present disclosure.

Turning now to FIG. 3C, FIG. 3C is a schematic block diagram illustrating a procedure for monitoring a file for zero-day attacks in accordance with embodiments of the present disclosure.

The Script API 224 can make a determination as to whether the run-time environment is appropriate for executing the JavaScript (324). For example, the script API 324 can determine whether the applications called by the script are the right version and can determine whether the general run-time environment includes the right aspects, features, or characteristics (e.g., operating system, build, version, etc.). If the environment is not appropriate for execution of the JavaScript, the script API 224 will not authorize the execution of the JavaScript, and the document reader 222 can exit (322) to perform other functions or to load other scripts. If, however, the environment is right for executing the JavaScript, the JavaScript is executed within the virtual machine 114 (326). In parallel, the malware monitoring logic 132 evaluates the JavaScript as it runs for malware or other malicious agents (328). In some embodiments, the malware monitoring logic 132 calls the EXP-C functionality to alert the malware monitoring logic of indirect branch calls performed by the JavaScript (330).

Figure 3D:
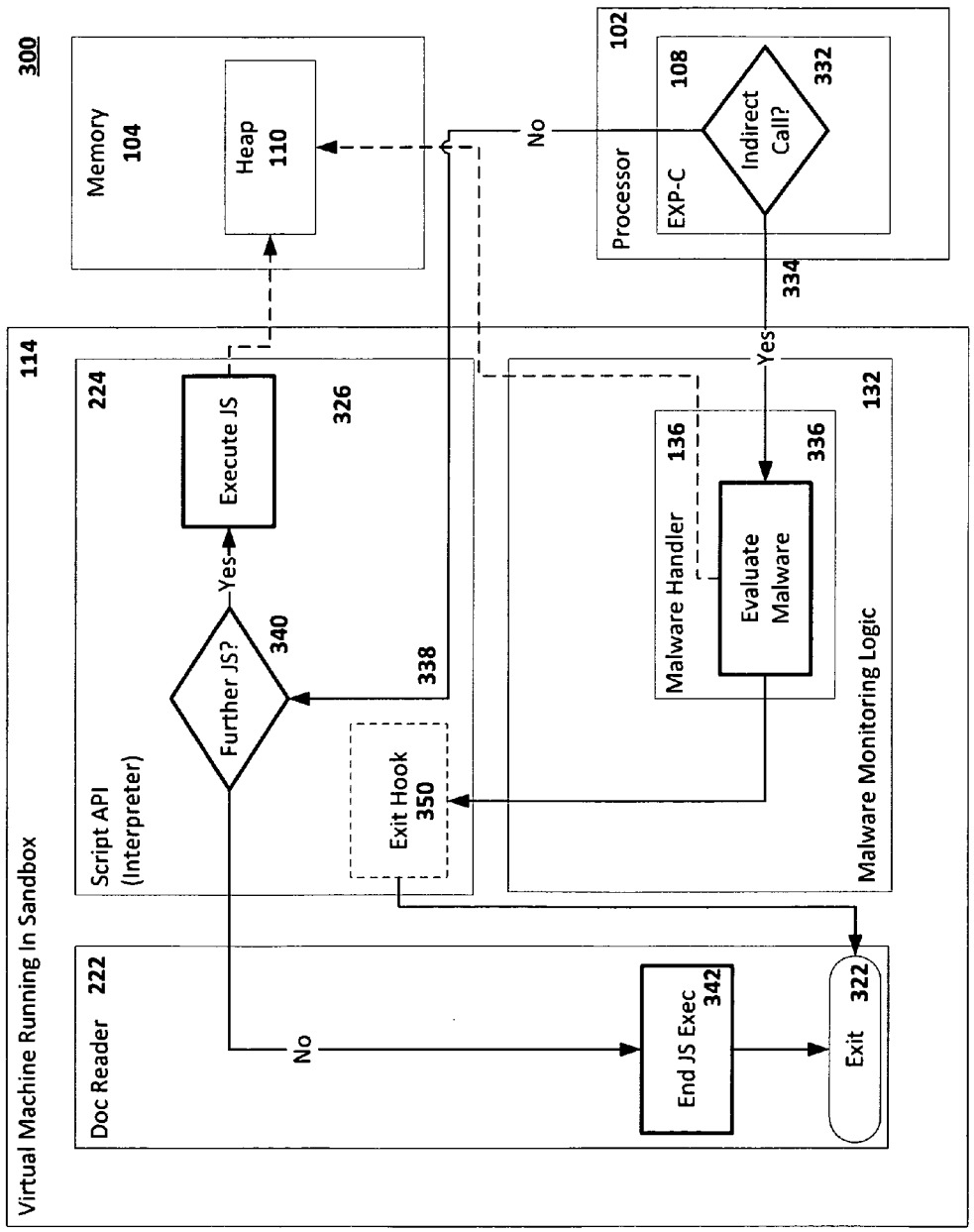
FIG. 3D is a process flow diagram for monitoring a file for zero-day attacks in accordance with embodiments of the present disclosure.

Turning now to FIG. 3D, FIG. 3D is a schematic block diagram illustrating a procedure for monitoring a file for zero-day attacks in accordance with embodiments of the present disclosure.

The malware monitoring logic 132 can call on the EXP-C to notify the malware handler 136 of indications of the presence of malware, such as indirect branches (332). EXP-C is described in more detail at FIGS. 7 and 8.

If the EXP-C identifies an indirect branch, the EXP-C can notify the malware handler 136 of the indirect branch and the details about that indirect branch, such as the memory locations associated with the branch call (334).

As an example, if the JavaScript includes an indirect branch call, the EXP-C branch filtering recognizes the indirect branch. The EXP-C can generate an internal event in the CPU to the EXP-C microcode. The EXP-C microcode instructs the CPU frontend to change the execution point from the intended memory location for executing the code from the indirect branch to the malware handler 136.

The malware handler 136 can then evaluate the code in the heap for malware or other malicious agents (336). For example, the malware handler 136 can identify the code in the high memory area of the heap, review the code for signs of malware, and execute the code to observe the code's dynamic behavior and collect information about the code's dynamic behavior.

If the process does not include an indirect branch, the control can be returned to the script API 224 (338). The script API can determine the next steps based on the next process in the JavaScript (340). If there is no further JavaScript to execute, the functionality can end JavaScript execution (342), and in some cases exit the document reader (322). If there is further JavaScript, the script API can continue from (318).

When the malware handler 136 has completed evaluating the JavaScript for malware, the malware handler 136 can exit (350).

In some implementations, the script API also includes an exit hook 350. Exit hook 350 can include an exit routine at the end of the script API JavaScript execution routine.

Figure 5:
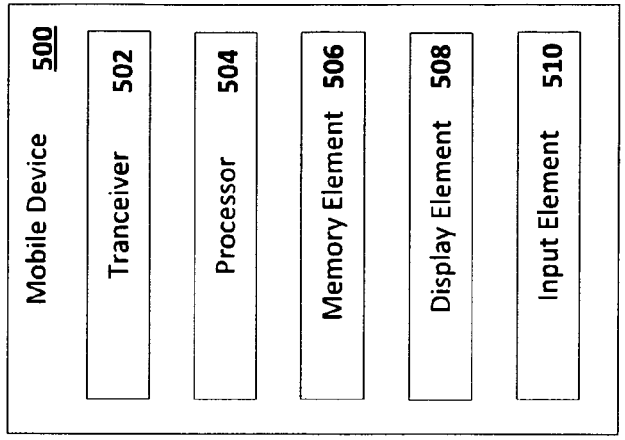
FIG. 5 is a schematic block diagram of a mobile device in accordance with embodiments of the present disclosure.
Figure 4:
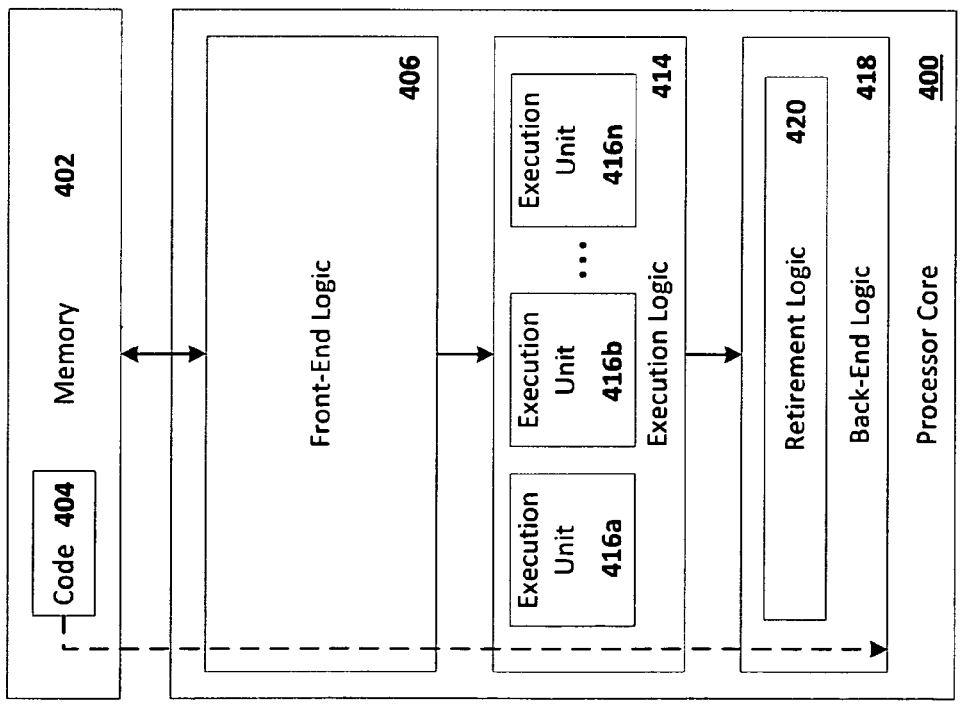
FIG. 4 is an example illustration of a processor according to an embodiment of the present disclosure.
Figure 6:
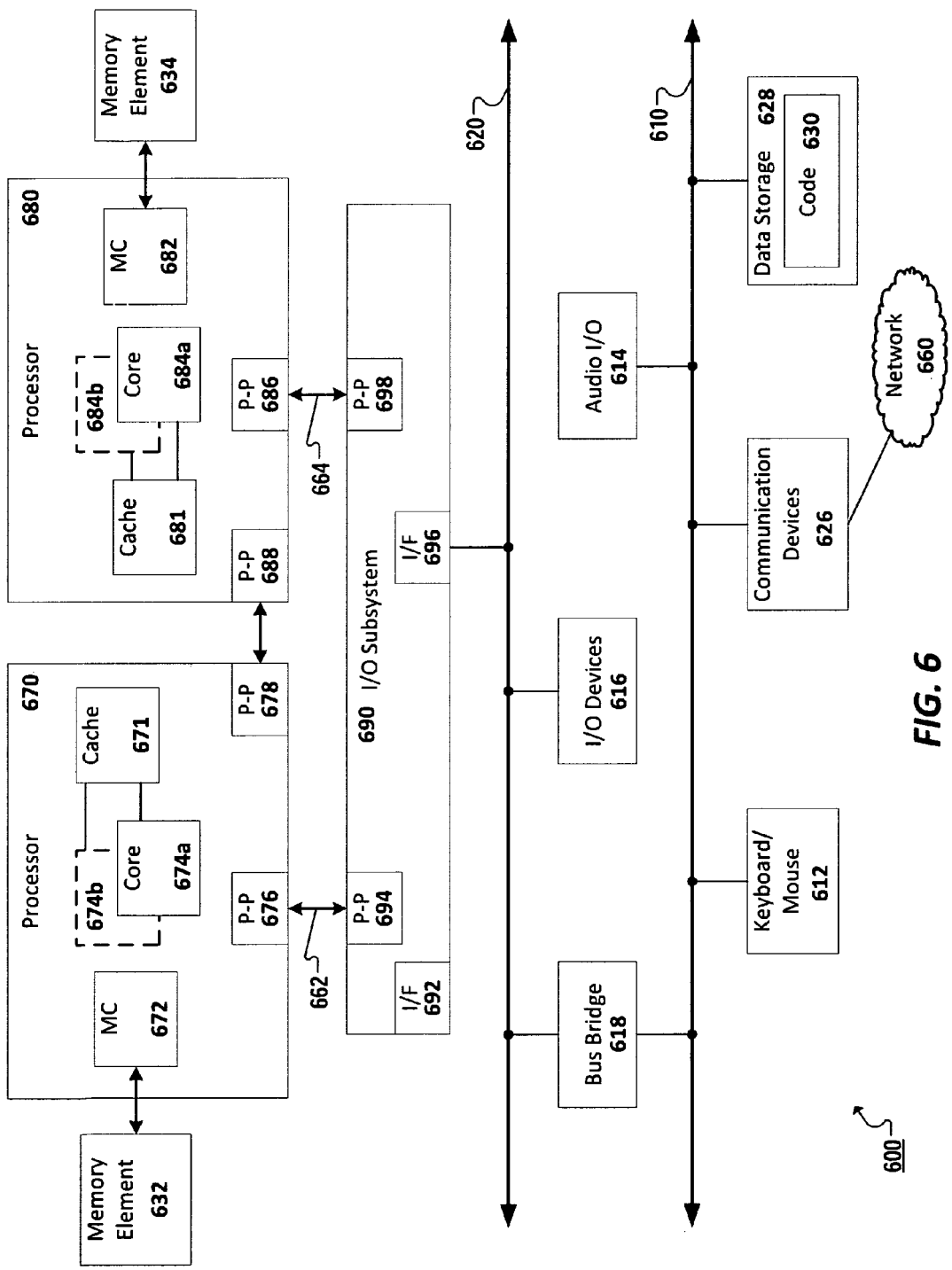
FIG. 6 is a schematic block diagram of a computing system according to an embodiment of the present disclosure.

FIGS. 4-6 are block diagrams of exemplary computer architectures that may be used in accordance with embodiments disclosed herein. Other computer architecture designs known in the art for processors, mobile devices, and computing systems may also be used. Generally, suitable computer architectures for embodiments disclosed herein can include, but are not limited to, configurations illustrated in FIGS. 4-6.

FIG. 4 is an example illustration of a processor according to an embodiment. Processor 400 is an example of a type of hardware device that can be used in connection with the implementations above.

Processor 400 may be any type of processor, such as a microprocessor, an embedded processor, a digital signal processor (DSP), a network processor, a multi-core processor, a single core processor, or other device to execute code. Although only one processor 400 is illustrated in FIG. 4, a processing element may alternatively include more than one of processor 400 illustrated in FIG. 4. Processor 400 may be a single-threaded core or, for at least one embodiment, the processor 400 may be multi-threaded in that it may include more than one hardware thread context (or "logical processor") per core.

FIG. 4 also illustrates a memory 402 coupled to processor 400 in accordance with an embodiment. Memory 402 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 400 can execute any type of instructions associated with algorithms, processes, or operations detailed herein. Generally, processor 400 can transform an element or an article (e.g., data) from one state or thing to another state or thing.

Code 404, which may be one or more instructions to be executed by processor 400, may be stored in memory 402, or may be stored in software, hardware, firmware, or any suitable combination thereof, or in any other internal or external component, device, element, or object where appropriate and based on particular needs. In one example, processor 400 can follow a program sequence of instructions indicated by code 404. Each instruction enters a front-end logic 406 and is processed by one or more decoders 408. The decoder may generate, as its output, a micro operation such as a fixed width micro operation in a predefined format, or may generate other instructions, microinstructions, or control signals that reflect the original code instruction. Front-end logic 406 also includes register renaming logic 410 and scheduling logic 412, which generally allocate resources and queue the operation corresponding to the instruction for execution.

Processor 400 can also include execution logic 414 having a set of execution units 416a, 416b, 416n, etc. Some embodiments may include a number of execution units dedicated to specific functions or sets of functions. Other embodiments may include only one execution unit or one execution unit that can perform a particular function. Execution logic 414 performs the operations specified by code instructions.

After completion of execution of the operations specified by the code instructions, back-end logic 418 can retire the instructions of code 404. In one embodiment, processor 400 allows out of order execution but requires in order retirement of instructions. Retirement logic 420 may take a variety of known forms (e.g., re-order buffers or the like). In this manner, processor 400 is transformed during execution of code 404, at least in terms of the output generated by the decoder, hardware registers and tables utilized by register renaming logic 410, and any registers (not shown) modified by execution logic 414.

Although not shown in FIG. 4, a processing element may include other elements on a chip with processor 400. For example, a processing element may include memory control logic along with processor 400. The processing element may include I/O control logic and/or may include I/O control logic integrated with memory control logic. The processing element may also include one or more caches. In some embodiments, non-volatile memory (such as flash memory or fuses) may also be included on the chip with processor 400.

Referring now to FIG. 5, a block diagram is illustrated of an example mobile device 500. Mobile device 500 is an example of a possible computing system (e.g., a host or endpoint device) of the examples and implementations described herein. In an embodiment, mobile device 500 operates as a transmitter and a receiver of wireless communications signals. Specifically, in one example, mobile device 500 may be capable of both transmitting and receiving cellular network voice and data mobile services. Mobile services include such functionality as full Internet access, downloadable and streaming video content, as well as voice telephone communications.

Mobile device 500 may correspond to a conventional wireless or cellular portable telephone, such as a handset that is capable of receiving "3G", or "third generation" cellular services. In another example, mobile device 500 may be capable of transmitting and receiving "4G" mobile services as well, or any other mobile service.

Examples of devices that can correspond to mobile device 500 include cellular telephone handsets and smartphones, such as those capable of Internet access, email, and instant messaging communications, and portable video receiving and display devices, along with the capability of supporting telephone services. It is contemplated that those skilled in the art having reference to this specification will readily comprehend the nature of modern smartphones and telephone handset devices and systems suitable for implementation of the different aspects of this disclosure as described herein. As such, the architecture of mobile device 500 illustrated in FIG. 5 is presented at a relatively high level. Nevertheless, it is contemplated that modifications and alternatives to this architecture may be made and will be apparent to the reader, such modifications and alternatives contemplated to be within the scope of this description.

In an aspect of this disclosure, mobile device 500 includes a transceiver 502, which is connected to and in communication with an antenna. Transceiver 502 may be a radio frequency transceiver. Also, wireless signals may be transmitted and received via transceiver 502. Transceiver 502 may be constructed, for example, to include analog and digital radio frequency (RF) 'front end' functionality, circuitry for converting RF signals to a baseband frequency, via an intermediate frequency (IF) if desired, analog and digital filtering, and other conventional circuitry useful for carrying out wireless communications over modern cellular frequencies, for example, those suited for 3G or 4G communications. Transceiver 502 is connected to a processor 504, which may perform the bulk of the digital signal processing of signals to be communicated and signals received, at the baseband frequency. Processor 504 can provide a graphics interface to a display element 508, for the display of text, graphics, and video to a user, as well as an input element 510 for accepting inputs from users, such as a touchpad, keypad, roller mouse, and other examples. Processor 504 may include an embodiment such as shown and described with reference to processor 400 of FIG. 4.

In an aspect of this disclosure, processor 504 may be a processor that can execute any type of instructions to achieve the functionality and operations as detailed herein. Processor 504 may also be coupled to a memory element 506 for storing information and data used in operations performed using the processor 504. Additional details of an example processor 504 and memory element 506 are subsequently described herein. In an example embodiment, mobile device 500 may be designed with a system-on-a-chip (SoC) architecture, which integrates many or all components of the mobile device into a single chip, in at least some embodiments.

FIG. 6 is a schematic block diagram of a computing system 600 according to an embodiment. In particular, FIG. 6 shows a system where processors, memory, and input/output devices are interconnected by a number of point-to-point interfaces. Generally, one or more of the computing systems described herein may be configured in the same or similar manner as computing system 600.

Processors 670 and 680 may also each include integrated memory controller logic (MC) 672 and 682 to communicate with memory elements 632 and 634. In alternative embodiments, memory controller logic 672 and 682 may be discrete logic separate from processors 670 and 680. Memory elements 632 and/or 634 may store various data to be used by processors 670 and 680 in achieving operations and functionality outlined herein.

Processors 670 and 680 may be any type of processor, such as those discussed in connection with other figures. Processors 670 and 680 may exchange data via a point-to-point (PtP) interface 650 using point-to-point interface circuits 678 and 688, respectively. Processors 670 and 680 may each exchange data with a chipset 690 via individual point-to-point interfaces 652 and 654 using point-to-point interface circuits 676, 686, 694, and 698. Chipset 690 may also exchange data with a high-performance graphics circuit 638 via a high-performance graphics interface 639, using an interface circuit 692, which could be a PtP interface circuit. In alternative embodiments, any or all of the PtP links illustrated in FIG. 6 could be implemented as a multi-drop bus rather than a PtP link.

Chipset 690 may be in communication with a bus 620 via an interface circuit 696. Bus 620 may have one or more devices that communicate over it, such as a bus bridge 618 and I/O devices 616. Via a bus 610, bus bridge 618 may be in communication with other devices such as a keyboard/mouse 612 (or other input devices such as a touch screen, trackball, etc.), communication devices 626 (such as modems, network interface devices, or other types of communication devices that may communicate through a computer network 660), audio I/O devices 614, and/or a data storage device 628. Data storage device 628 may store code 630, which may be executed by processors 670 and/or 680. In alternative embodiments, any portions of the bus architectures could be implemented with one or more PtP links.

The computer system depicted in FIG. 6 is a schematic illustration of an embodiment of a computing system that may be utilized to implement various embodiments discussed herein. It will be appreciated that various components of the system depicted in FIG. 6 may be combined in a system-on-a-chip (SoC) architecture or in any other suitable configuration capable of achieving the functionality and features of examples and implementations provided herein.

Figure 7:
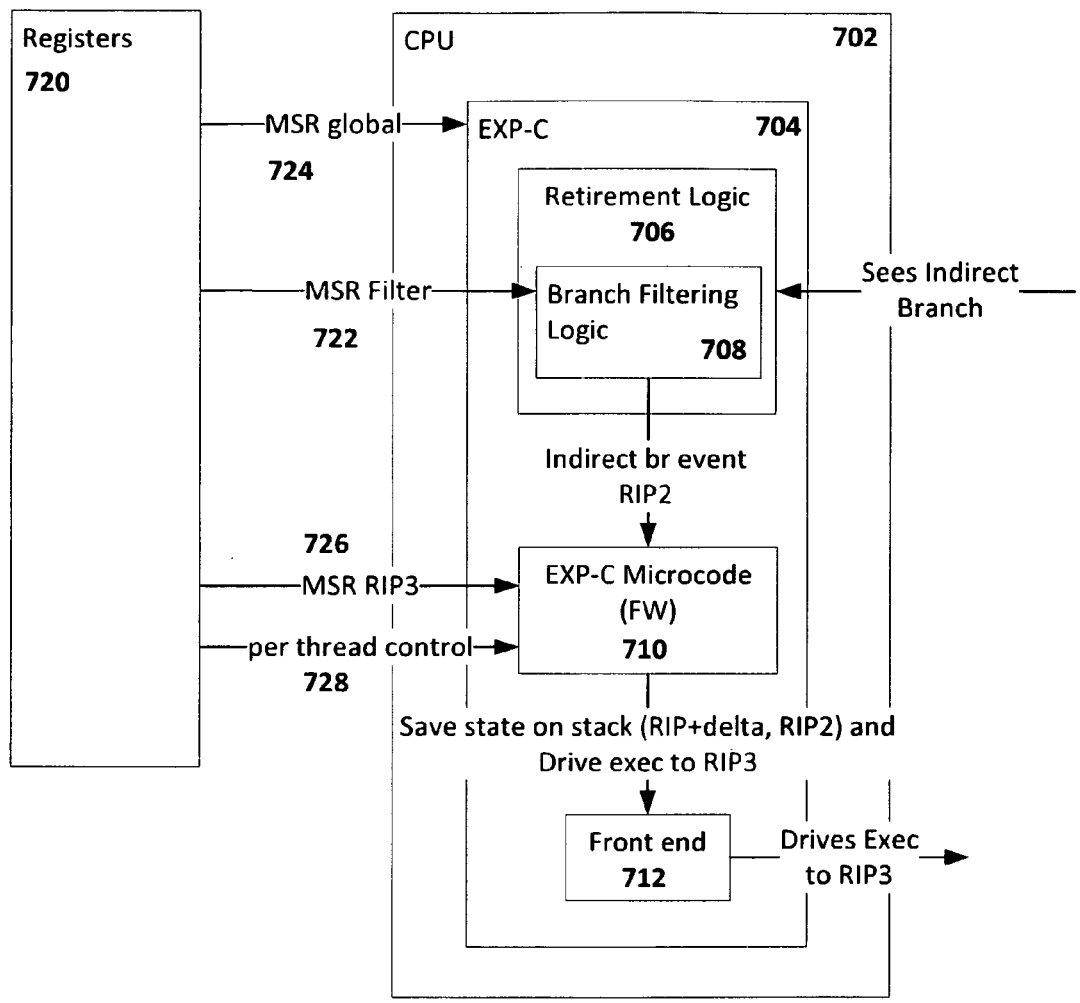
FIG. 7 is a schematic block diagram of an example hardware implementation of execution profiling in accordance with embodiments of this disclosure.

FIG. 7 is a schematic block diagram of an example hardware implementation of execution profiling in accordance with embodiments of this disclosure. FIG. 7 includes an EXP-C implementation scenario 700. EXP-C implementation scenario includes a processor 702 and a set of registers 720. The CPU includes an EXP-C logic 704 implemented at least partially in hardware. EXP-C logic 704 includes retirement logic 706, which uses branch filtering logic 708. EXP-C logic 704 also includes EXP-C microcode (firmware), though in some implementations, the EXP-C can work entirely in hardware. The CPU also includes a front end 712.

The EXP-C 704 can be enabled by a model specific register (MSR) global input from the registers set 720. The MSR global 275 input enables the EXP-C functionality in the CPU 702.

Figure 8A:
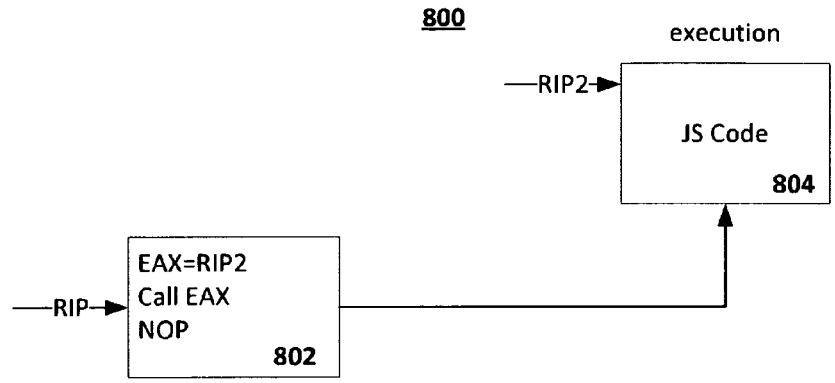
FIGS. 8A and 8B are schematic block diagrams of an example software implementation of execution profiling in accordance with embodiments of this disclosure.
Figure 8B:
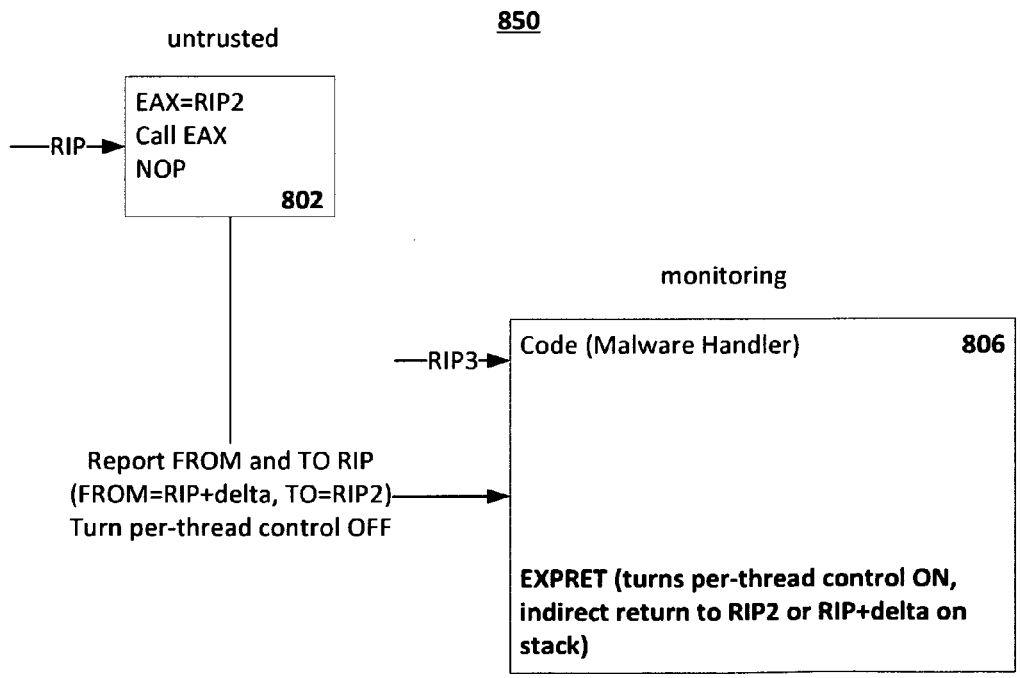

FIGS. 8A and 8B are schematic block diagrams of an example software implementation of execution profiling in accordance with embodiments of this disclosure. FIGS. 7 and 8A and 8B are discussed together.

For context, FIG. 8A shows a branch instruction 802 with an instruction pointer RIP pointing to the branch instruction and an instruction pointer RIP2 pointing to the memory location for executing the next code instruction. When EXP-C is inactive, the branch instruction is executed normally (804), and the instruction pointer RIP2 points to the new memory location for executing the code instruction.

In FIG. 8B, EXP-C is activated (prior to executing the branch instruction 802). The indirect branch 802 is identified, which includes the indirect branch (Call EAX) and the location of the indirect branch instruction (EAX=RIP2).

Turning briefly to FIG. 7, the retirement logic 706 is informed of executed operation, such as the indirect branch call 802. The branch filter logic 708 can be programmed with necessary information for identifying indirect branch calls. For example a model specific register (MSR) filter 722 can be used by the branch filtering logic 708 to provide filtering criteria necessary for the branch filtering logic 708 to types distinguish between different of calls (e.g., far indirect branches, near indirect branches, unconditional indirect jumps, far indirect jumps, near indirect returns, etc.). In the context of FIG. 8B, the branch filtering logic 708 creates an indirect branch event in the EXP-C and provides the EXP-C microcode with RIP2 address of the indirect branch. The RIP2 information comes in from the retirement logic 706 from the indirect branch execution. The EXP-C microcode 710 can then instruct the CPU frontend to drive execution of the indirect branch to another register address, RIP3 in this case.

The EXP-C microcode receives the RIP3 address from the registers set 720, which is a register address for executing code by the malware handler. Additionally, the instruction pointer state information is stored on the stack (here, RIP+delta and RIP2 are stored on the stack). The CPU front end 712 then drives execution of the indirect branch to RIP3. The malware handler can then inject code into the RIP3 address space for execution.

Returning to FIG. 8B, the RIP3 points to the address space for the malware handler execution. After the malware handler runs, the EXPRET can run. EXPRET turns on per-thread control (which was turned off prior to running malware handler). The EXPRET then performs an indirect branch to the RIP2 (to execute the original indirect branch) or returns to RIP+delta, which is the next instruction after the EAX (in this case, the NOP in 802).

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

In example 1, aspects of the embodiments are directed to a computer program product tangibly embodied on non-transient computer readable media, the computer program product including instructions operable when executed to launch a malware monitor upon execution of a script API; identifying script code in a heap memory; and evaluate the script code in the heap memory for malicious code prior to execution of the script code.

In example 2, the subject matter of example 1 may also include instructions operable to monitor execution of script code in the sandbox; and determine the presence or absence of malware based on execution of the script code.

In example 3, the subject matter of any of examples 1 or 2 may also include instructions operable to the presence or absence of malware based on execution profiling.

In example 4, the subject matter of any of examples 1 or 2 or 3 may also include instructions operable to determine that one or more application versions are compatible with the script code; and execute the script code in the sandbox based on the determination that one or more application versions are compatible with the script code.

In example 5, the subject matter of any of examples 1 or 2 or 3 or 4 may also include instructions operable to identify a start of an execution of the script code in the sandbox; identify an end of the execution of the script code in the sandbox; and determine that the script code contains malicious code based on a time difference from the start of the execution to the end of the execution of the script code.

In example 6, the subject matter of any of examples 1 or 2 or 3 or 4 or 5 may also include instructions operable to hook into the script API engine to call the sandbox at the start of the execution and the end of the execution of the script code.

In example 7, aspects of the embodiments are directed to a computer implemented method that includes launching a malware monitor upon execution of a script API; identifying, by the malware monitor, script code in a heap memory, the script code; and evaluating, by the malware monitor, the script code in the heap memory for malicious code prior to execution of the script code.

In example 8, the subject matter of example 7 may also include monitoring, by the malware monitor, execution of script code in the sandbox; and determining, by the malware monitor, the presence or absence of malware based on execution of the script code.

In example 9, the subject matter of any of examples 7 or 8 may also include the that malware monitor includes an execution profiler implemented at least partially in hardware, the method further including determining, by the execution profiler, the presence or absence of malware.

In example 10, the subject matter of any of examples 7 or 8 or 9 may also include determining the presence or absence of malware by executing one or more branches of the script; and determining whether the script contains malware based on the results of executing each of the one or more branches of the script.

In example 11, the subject matter of any of examples 7 or 8 or 9 or 10 can also include determining, by an interpreter implemented at least partially in hardware, that one or more application versions are compatible with the script code; and executing, by the sandbox, the script code in the sandbox based on the determination that one or more application versions are compatible with the script code.

In example 12, the subject matter of any of examples 7 or 8 or 9 or 10 or 11 can also include identifying, by the sandbox, a start of an execution of the script code in the sandbox; identifying, by the sandbox, an end of the execution of the script code in the sandbox; and determining, by the sandbox, that the script code contains malicious code based on a time difference from the start of the execution to the end of the execution of the script code.

In example 13, the subject matter of any of examples 7 or 8 or 9 or 10 or 11 or 12 can also include hooking, by the hooking module, into the script API engine to call the sandbox at the start of the execution and the end of the execution of the script code.

In example 14, a computing system for zero-day malware detection may include an interpreter module implemented at least partially in hardware to prepare a script code for execution; a sandbox module implemented at least partially in hardware, the interpreter module including instructions to call a sandbox module upon execution; a heap memory to dynamically storing the script code; and malware monitor to identify the script code in the heap memory and evaluate the script code for malware prior to execution of the script code.

In example 15, the subject matter of example 14 may also include that the interpreter module is configured to identify embedded script code in a document; call the sandbox upon identifying the script code; and store the script code in the heap memory.

In example 16, the subject matter of any of examples 14 or 15 may also include that the interpreter module is configured to determine that the sandbox comprises one or more applications with compatible versions for the execution of the script code and execute the script code based on the determination.

In example 17, the subject matter of any of examples 14 or 15 or 16 may also include that the malware monitor is configured to monitor execution of the script code in the sandbox; and determine the presence or absence of malware based on the execution of the script.

In example 18, the subject matter of any of examples 14 or 15 or 16 or 17 may also include that the malware monitor is configured to determine the presence of absence of malware based on execution profiling of the script.

In example 19, the subject matter of example 18 can also include that execution profiling includes executing one or more branches of the script code; evaluating a result from the one or more branches, and determining the presence or absence of malware based on the result from each of the one or more branch executions.

In example 20, the subject matter of any of examples 14 or 15 or 16 or 17 or 18 or 19 may also include that the sandbox module is configured to identify an execution start time of the script code; identify an execution end time of the script code; determine a time period between the start time and the end time of the script code; and determine, based on the time period, that the script code contains malware.

In example 21, the subject matter of any of examples 14 or 15 or 16 or 17 or 18 or 19 or 20 can also include a hooking module configured to hook into the interpreter module to implant code to call the sandbox upon execution of the script code.

In example 22, the subject matter of example 1 may also include hooking a call for a sandbox into a script application program interface (API).

In example 23, the subject matter of example 7 may also include hooking a call for a sandbox into a script application program interface (API).

Example 24 may include the subject matter of example 17, further including a hooking module configured to hook into the interpreter module to implant code to call the sandbox upon execution of the script code.

Example 25 is a computing device that includes a means for launching a malware monitor implemented at least partially in hardware upon execution of a script application programming interface (API); means for identifying script code in a heap memory, the script code loaded into the heap memory by a script API; and a means for evaluating the script code in the heap memory for malicious code prior to execution of the script code.

Example 26 may include the subject matter of example 25, further including a means for monitoring, by the malware monitor, execution of script code in the sandbox; and means for determining, by the malware monitor, the presence or absence of malware based on execution of the script code.

Example 27 may include the subject matter of any of examples 25, wherein the malware monitor comprises an execution profiler implemented at least partially in hardware, the method further comprising determining, by the execution profiler, the presence or absence of malware.

Example 28 may include the subject matter of example 27, wherein determining the presence or absence of malware comprises executing one or more branches of the script; and determining whether the script contains malware based on the results of executing each of the one or more branches of the script.

Example 29 may include the subject matter of example 25, further comprising means for determining that one or more application versions are compatible with the script code; and means for executing the script code in the sandbox based on the determination that one or more application versions are compatible with the script code.

Example 30 may include the subject matter of example 25, further comprising means for identifying, by the malware monitor, a start of an execution of the script code in the sandbox; means for identifying, by the malware monitor, an end of the execution of the script code in the sandbox; and means for determining, by the malware monitor, that the script code contains malicious code based on a time difference from the start of the execution to the end of the execution of the script code.

Example 31 may include the subject matter of example 25, further comprising means for hooking into the script API engine to call the malware monitor at the start of the execution and the end of the execution of the script code.

Example 32 may include the subject matter of example 25, further comprising means for hooking into a script API to implant code into the script API that calls the malware monitor upon execution of the script API.

Example 33 may include the subject matter of example 32, wherein execution profiling comprises executing one or more indirect branches of the script code; evaluating a result from the one or more branches, and determining the presence or absence of malware based on the result from each of the one or more branch executions.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A computer program product tangibly embodied on non-transient computer readable media, the computer program product comprising instructions operable when executed to:
   execute script code by a script application programming interface (API);
   detect, by a decoder, an event in the script code, the event comprising an indirect branch call;
   redirect an instruction pointer to a predetermined memory location pointer based on the detection of the indirect branch call, the predetermined memory location comprising malware monitoring code;
   execute the malware monitoring code in a sandbox upon execution of the redirection of the instruction pointer to the predetermined memory location;
   identify, in a heap memory by the malware monitoring code, the script code loaded into the heap memory; and
   evaluate, by the malware monitoring code, the script code in the heap memory for malicious code prior to execution of the script code;
   wherein the instructions are further operable to:
      identify a start of an execution of the script code in the sandbox;
      identify an end of the execution of the script code in the sandbox; and
      determine that the script code contains malicious code based on a time difference from the start of the execution to the end of the execution of the script code.

2. The computer program product of claim 1, wherein the instructions are further operable to determine the presence or absence of malware based on execution profiling.

3. The computer program product of claim 1, wherein the instructions are further operable to:
   determine that one or more application versions are compatible with the script code; and
   execute the script code in the sandbox based on the determination that one or more application versions are compatible with the script code.

4. The computer program product of claim 1, wherein the instructions are further operable when executed to hook into the script API to implant code into the script API that calls the malware monitoring code upon execution of the script API.

5. A computer implemented method comprising:
   identifying one or more commands that when called trigger an instruction pointer redirection to a predetermined memory address;
   identifying the memory address to be redirected to if the one or more commands are called, the memory address comprising malware monitoring code;
   executing script code by a script application programming interface (API);
   detecting, by a decoder, an event in the script code, the event comprising an indirect branch call;
   redirecting an instruction pointer to a predetermined memory location pointer based on the detection of the indirect branch call, the predetermined memory location comprising malware monitoring code;
   executing, by a hardware processor, the malware monitoring code in a sandbox upon execution of the redirection of the instruction pointer to the predetermined memory location;
   identifying, by the malware monitoring code, the script code in a heap memory, the script code loaded into the heap memory by the script API; and evaluating, by the malware monitoring code, the script code in the heap memory for malicious code prior to execution of the script code;

the method further comprising:

identifying, by the malware monitoring code, a start of an execution of the script code in the sandbox;

identifying, by the malware monitoring code, an end of the execution of the script code in the sandbox; and determining, by the malware monitoring code, that the script code contains malicious code based on a time difference from the start of the execution to the end of the execution of the script code.

6. The computer implemented method of claim 5, wherein the malware monitoring code comprises an execution profiler implemented at least partially in hardware, the method further comprising determining, by the execution profiler, the presence or absence of malware.

7. The computer implemented method of claim 6, wherein determining the presence or absence of malware comprises executing one or more branches of the script code; and determining whether the script code contains malware based on the results of executing each of the one or more branches of the script code.

8. The computer implemented method of claim 5, further comprising:

determining, by an interpreter implemented at least partially in hardware, that one or more application versions are compatible with the script code; and executing, by the malware monitoring code, the script code in the sandbox based on the determination that one or more application versions are compatible with the script code.

9. The computer implemented method of claim 5 further comprising hooking, by a hooking module, into the script API to call the malware monitoring code at a start of an execution and an end of the execution of the script code.

10. The computer implemented method of claim 5, further comprising hooking into the script API to implant code into the script API that calls the malware monitoring code upon execution of the script API.

11. The computer implemented method of claim 10, wherein execution profiling comprises executing one or more indirect branches of the script code; evaluating a result from the one or more branches, and determining the presence or absence of malware based on the result from each of the one or more branch executions.

12. A computing system for zero-day malware detection comprising:

a script application programming interface (API) module implemented at least partially in hardware to load a script code into heap memory for execution;

a decoder implemented at least partially in hardware to identify one or more commands comprising an indirect branch call and redirect an execution pointer to point to a predetermined memory location pointer based on the detection of the indirect branch call, the predetermined memory location pre-loaded with malware monitoring logic;

a heap memory to dynamically store the script code;

the malware monitoring logic preloaded into the predetermined memory location to identify the script code in the heap memory and evaluate the script code for malware prior to execution of the script code;

a processor implemented at least partially in hardware, the processor configured to:

execute the malware monitoring logic in a sandbox upon execution of the redirection of the instruction pointer to the predetermined memory location;

identify, in the heap memory by the malware monitoring logic, script code loaded into the heap memory; and evaluate, by the malware monitoring logic, the script code in the heap memory for malicious code prior to execution of the script code identify, by the malware monitoring logic, an execution start time of the script code in the sandbox;

identify, by the malware monitoring logic, an execution end time of the script code in the sandbox;

determine a time period between the execution start time and the execution end time of the script code; and determine, based on the time period, that the script code contains malware.

13. The computing system of claim 12, wherein the script API module is configured to:

identify embedded script code in a document;

call the malware monitor logic upon identifying the script code; and store the script code in the heap memory.

14. The computing system of claim 13, wherein the script API module is configured to determine that one or more applications with compatible versions for the execution of the script code are present and execute the script code based on the determination.

15. The computing system of claim 12, wherein the malware monitor logic is configured to determine the presence of absence or malware based on execution profiling of the script code.

16. The computing system of claim 15, wherein execution profiling comprises executing one or more indirect branches of the script code; evaluating a result from the one or more branches, and determining the presence or absence of malware based on the result from each of the one or more branch executions.

17. The computing system of claim 12, further comprising a hooking logic to hook into an interpreter module to implant code to call a sandbox upon execution of the script code.

* * * * *

UNITED STATES PATENT AND TRADEMARK OFFICE
CERTIFICATE OF CORRECTION

PATENT NO. : 9,898,605 B2
APPLICATION NO. : 14/757979
DATED : February 20, 2018
INVENTOR(S) : Ravi Sahita et al.

Page 1 of 1

It is certified that error appears in the above-identified patent and that said Letters Patent is hereby corrected as shown below:

On sheet 7 of 10, in Figure 5, reference numeral 502, Line 1, delete "Tranceiver" and insert -- Transceiver --, therefor.

In Column 16, Line 43, in Claim 15, delete "of absence or" and insert -- or absence of --, therefor.

Signed and Sealed this
Seventh Day of August, 2018

Andrei Iancu
*Director of the United States Patent and Trademark Office*